(12) United States Patent
van Klooster et al.

(10) Patent No.: US 11,359,949 B2
(45) Date of Patent: Jun. 14, 2022

(54) ULTRASONIC FLOWMETER

(71) Applicant: KROHNE AG, Basel (CH)

(72) Inventors: Jeroen Martin van Klooster, Tiel (NL); Arie Huijzer, Sliedrecht (NL)

(73) Assignee: KROHNE AG, Basel (CH)

( * ) Notice: Subject to any disclaimer, the term of this patent is extended or adjusted under 35 U.S.C. 154(b) by 48 days.

(21) Appl. No.: 16/894,203

(22) Filed: Jun. 5, 2020

(65) Prior Publication Data

US 2020/0386592 A1     Dec. 10, 2020

(30) Foreign Application Priority Data

Jun. 7, 2019  (DE) .......................... 102019115590.8

(51) Int. Cl.
| | |
|---|---|
| *G01F 1/66* | (2022.01) |
| *G01N 29/22* | (2006.01) |
| *G01N 29/02* | (2006.01) |
| *G01F 1/667* | (2022.01) |

(52) U.S. Cl.
CPC .............. *G01F 1/662* (2013.01); *G01F 1/66* (2013.01); *G01F 1/667* (2013.01); *G01N 29/02* (2013.01); *G01N 29/222* (2013.01); *G01N 29/223* (2013.01)

(58) Field of Classification Search
CPC .......... G01F 1/662; G01F 1/667; G01F 1/66; G01N 29/223; G01N 29/02; G01N 29/222
See application file for complete search history.

(56) References Cited

U.S. PATENT DOCUMENTS

| | | |
|---|---|---|
| 5,546,812 A | 8/1996 | Drenthen |
| 9,528,866 B2 | 12/2016 | Wiest et al. |
| 2015/0204704 A1* | 7/2015 | Wiest ...................... G01F 1/667 73/861.28 |

FOREIGN PATENT DOCUMENTS

| | | |
|---|---|---|
| DE | 102011079250 A1 | 1/2013 |
| DE | 102012013916 A1 | 1/2014 |
| DE | 102013105407 A1 | 11/2014 |
| DE | 102013105922 A1 | 12/2014 |
| EP | 175155 A1 | 3/1986 |

(Continued)

OTHER PUBLICATIONS

European Search Report; Application No. EP 20 17 7040; dated Oct. 22, 2020; 3 Pages.

*Primary Examiner* — Benjamin R Schmitt
(74) *Attorney, Agent, or Firm* — Whitmyer IP Group, LLC

(57) ABSTRACT

An ultrasonic flowmeter includes a measuring tube and first and second ultrasonic transducers. The first ultrasonic transducer is an ultrasonic transmitter and/or an ultrasonic receiver, and the second ultrasonic transducer is an ultrasonic transmitter and/or an ultrasonic receiver. The ultrasonic transducers are offset on the measuring tube such that the respective transmitter transmits an ultrasonic signal in the direction of flow or against the direction of flow, and the receiver receives the ultrasonic signal after at least three reflections. A course of the ultrasonic signal defines a signal path with first and second signal path sections. The number of sub-sections of the first signal path section corresponds to the number of sub-sections of the second signal path section. The signal path in the first signal path section has a first direction of rotation, and the signal path in the second signal path section has an opposite, second direction of rotation.

10 Claims, 4 Drawing Sheets

(56) References Cited

FOREIGN PATENT DOCUMENTS

| EP | 0639776 A1 | | 2/1995 | |
|---|---|---|---|---|
| EP | 715155 A1 | * | 6/1996 | ............... G01F 1/66 |
| EP | 3404372 A1 | | 11/2018 | |
| WO | 2014012707 A1 | | 1/2014 | |
| WO | 2014191136 A1 | | 12/2014 | |

* cited by examiner

ULTRASONIC FLOWMETER

TECHNICAL FIELD

The invention is based on an ultrasonic flowmeter with at least one measuring tube, with at least one first ultrasonic transducer and one second ultrasonic transducer, wherein the first ultrasonic transducer is designed as an ultrasonic transmitter and/or as an ultrasonic receiver and wherein the second ultrasonic transducer is designed as an ultrasonic transmitter and/or as an ultrasonic receiver, wherein the ultrasonic transducers are arranged offset on the measuring tube, viewed in the direction of flow, such that, during operation, the respective transmitter transmits an ultrasonic signal in the direction of flow or against the direction of flow, and that the receiver receives the ultrasonic signal transmitted by the transmitter after at least three reflections, wherein at least three reflection surfaces are provided, and wherein the course of the ultrasonic signal between the ultrasonic transducers defines a signal path.

BACKGROUND

The measurement of the flow rate of a medium flowing through a measuring tube with an ultrasonic flowmeter is known from the state of the art. Ultrasonic flowmeters usually have a measuring tube and at least two ultrasonic transducers designed as ultrasonic transmitters and/or ultrasonic receivers, which are arranged on the measuring tube at a distance from each other in the direction of flow (axially in relation to the measuring tube axis). To measure the flow rate, an ultrasonic signal is emitted along the signal path between the ultrasonic transducers both in the direction of flow and against the direction of flow. Due to the entrainment effect, there is a different transit time from the signals moving along a signal path with or against the flow. The difference in transit time is used to determine the flow velocity and, taking the measuring tube cross-section into account, the volume flow rate.

Ultrasonic flowmeters are also known, wherein the signal path between the two ultrasonic transducers is extended by one or more reflections on one reflecting surface each.

The document DE 10 2013 105 922 A1 discloses an ultrasonic flowmeter, wherein the signal path between the two ultrasonic transducers is designed such that it forms a closed signal path in an axial plan view of the measuring tube cross-section and wherein the signal is reflected back into an almost identical plane at two points within the measuring tube. For the purposes of this document, the relevant plane is defined as a plane parallel to the measuring tube axis, which is spanned by a section of the signal path. Due to the closed signal path in combination with a double back reflection, rotating flows with vortices can also be reliably detected, as they can occur in connection with disturbances in the pipe, for example pipe bends, 90° bends, etc.

In addition, an ultrasonic flowmeter is known from publication EP 0 639 776 A1, wherein a plurality of pairs of ultrasonic transducers are arranged on the measuring tube in such a way that at least two ultrasonic signals are emitted into the measuring tube, wherein the signal paths formed by the respective course of the ultrasonic signals have a different degree of sensitivity with respect to the symmetry of the flow profile and wherein at least one sound wave passes through the measuring tube in a clockwise direction and wherein at least one sound wave passes through the measuring tube in a counter-clockwise direction. With this arrangement, for example, flow profiles which exhibit vortices can also be reliably measured.

In principle, a direction of rotation (clockwise or counterclockwise) can be defined for signal paths that have at least one reflection on a reflecting surface (so-called multi-path systems), with which the ultrasonic signal passes through the measuring tube.

SUMMARY

Based on this state of the art, the object of the invention to provide an ultrasonic flowmeter which has a particularly simple design and which has a particularly high measuring accuracy even in the case of irregular flows which, for example, exhibit vortices.

According to the invention, this object is achieved in that the signal path has at least one first signal path section and at least one second signal path section, wherein the first signal path section has at least two sub-sections, wherein the second signal path section has at least two sub-sections and wherein the number of sub-sections of the first signal path section corresponds to the number of sub-sections of the second signal path section and that the signal path in the first signal path section has a first direction of rotation and that the signal path in the second signal path section has a second direction of rotation, wherein the second direction of rotation is opposite the first direction of rotation.

In particular, the first signal path section has directly successive sub-sections and the second signal path section also has directly successive sub-sections.

According to the invention, it has been recognized that a particularly high measuring accuracy can be achieved in multi-path systems by aligning the ultrasonic transducers such that a first scanning of the flow profile in a first signal path section takes place in one direction of rotation, for example clockwise, when viewed in axial plan view of the measuring tube cross-section, and that the scanning of the flow to be measured in a second signal path section takes place in the opposite direction of rotation, for example counterclockwise.

According to the invention, the two signal path sections have the same number of sub-sections, so that the flow is passed through in equal proportions in the first direction of rotation and also in the opposite direction of rotation. This design according to the invention has the advantage that rotating parts of a flow, in particular vortices, which generate fictitious velocity components when measuring the flowing medium by means of ultrasonic signals, are passed through in different directions, whereby these disturbing components can be effectively filtered out.

As a result, the ultrasonic flowmeter according to the invention has a particularly high measuring accuracy even with irregular flow profiles, which in particular include vortices.

According to a first design, the measuring tube has an inner wall, wherein at least one reflecting surface is formed by the inner wall of the measuring tube. Preferably all reflecting surfaces within a signal path section, i.e. with the exception of the reflecting surface which is arranged between the first signal path section and the second signal path section, are formed by the inner wall of the measuring tube. Each individual reflecting surface can, for example, be formed by the smooth inner wall of the measuring tube or by a deformation of the measuring tube, wherein the reflecting surface either projects into the measuring tube or is set back in relation to the inner wall.

According to a next advantageous design, at least one reflector element is provided, wherein the at least one reflector element is preferably arranged between the first signal path section and the second signal path section. The reflector element is thus particularly preferentially arranged between the two ultrasonic transducers, particularly in the middle, when viewed in the direction of flow. According to one design, the two ultrasonic transducers and the reflecting surface formed by the reflector element are arranged at the same point on the circumference of the measuring tube when viewed in the axial direction.

The presence of a reflector element with a reflecting surface, in particular between the first signal path section and the second signal path section, has the advantage that the reflection of the ultrasonic signal from the first signal path section into the second signal path section can be made particularly flexible with respect to the direction of reflection using a corresponding design and arrangement of the reflecting surface.

In a particularly preferred design, the reflecting surfaces within the first and second signal path sections are each formed by the smooth inner wall of the measuring tube and the reflecting surface between the first and second signal path sections is formed by a reflector element. This design has the advantage that it is particularly simple, since the flow profile is completely scanned in two directions of rotation with the help of only one reflector element.

According to a next design, the reflector element or the reflecting surface formed by the reflector element is set back in relation to the inner wall of the measuring tube. Alternatively or additionally at least one reflector element or the reflecting surface formed by the reflector element projects into the measuring tube. Alternatively or additionally a reflector element or the reflecting surface formed by the reflector element is flush with the inner wall of the measuring tube.

In particular for measuring the edge areas of the flowing medium, it is also conceivable that at least one ultrasonic transducer or both ultrasonic transducers are set back in relation to the inner wall of the measuring tube. Alternatively, at least one ultrasonic transducer or both ultrasonic transducers can project into the measuring tube.

The flexible possibility of arranging one or more reflector elements and/or the ultrasonic transducers makes it possible to implement different signal path geometries.

According to a next preferred design, the reflecting surface between the first signal path section and the second signal path section is designed and arranged such that the reflection causes a reversal of direction with respect to the rotation of the signal path. The reversal of direction is particularly preferred in that the ultrasonic signal is essentially reflected back into the plane of the incident ultrasonic signal.

According to another advantageous design, the first signal path section has more than two sub-sections, wherein the first signal path section passes through the flow cross-section in a substantially circular manner in axial plan view of the measuring tube cross-section and the second signal path section has more than two sub-sections, wherein the second signal path section passes through the flow cross-section in a substantially circular manner in axial plan view of the measuring tube cross-section.

When it is said that the first signal path section or the second signal path section passes through the flow cross-section in a substantially circular manner, it is meant that the first or the second signal path section has substantially the shape of a polygon in axial plan view of the measuring tube cross-section.

According to one design, the polygon is closed. In this design, the first ultrasonic transducer and/or the second ultrasonic transducer and the reflection surface between the first signal path section and the second signal path section are arranged in the axial direction of the measuring tube at the same point on the circumference of the measuring tube.

According to another design, the first ultrasonic transducer and the second ultrasonic transducer and/or the reflection surface between the first signal path section and the second signal path section are arranged slightly offset in the axial direction of the measuring tube with respect to the measuring tube circumference.

According to one design, the signal path is designed as a closed path when viewed in axial plan view of the measuring tube cross-section. According to this design, the ultrasonic transducers are arranged in the axial direction of the measuring tube at the same point on the circumference of the measuring tube.

This design has the advantage that the flow cross-section is essentially circularly recorded, which also increases the measuring accuracy.

According to another advantageous design, each signal path section forms a closed path in axial plan view.

It is particularly preferred that the signal path of the first signal path section and the signal path of the second signal path section are essentially congruent in axial plan view. According to this design, there are corresponding sub-sections which lie in the same plane parallel to the measuring tube axis and which are passed through in a first direction of rotation in the first signal path section and which are passed through in an opposite direction of rotation in the second signal path section.

According to a next design, the first signal section and the second signal section each have more than two sub-sections, wherein the signal path and/or each signal path section essentially forms a polygon, in particular a triangle or a quadrilateral or a pentagon, in axial plan view of the measuring tube cross-section.

BRIEF DESCRIPTION OF THE DRAWINGS

In detail, there is now a plurality of possibilities for designing and further developing the ultrasonic flowmeter according to the invention. For this purpose, reference is made to the following description of preferred embodiments in connection with the drawings.

DETAILED DESCRIPTION

Figure 1:
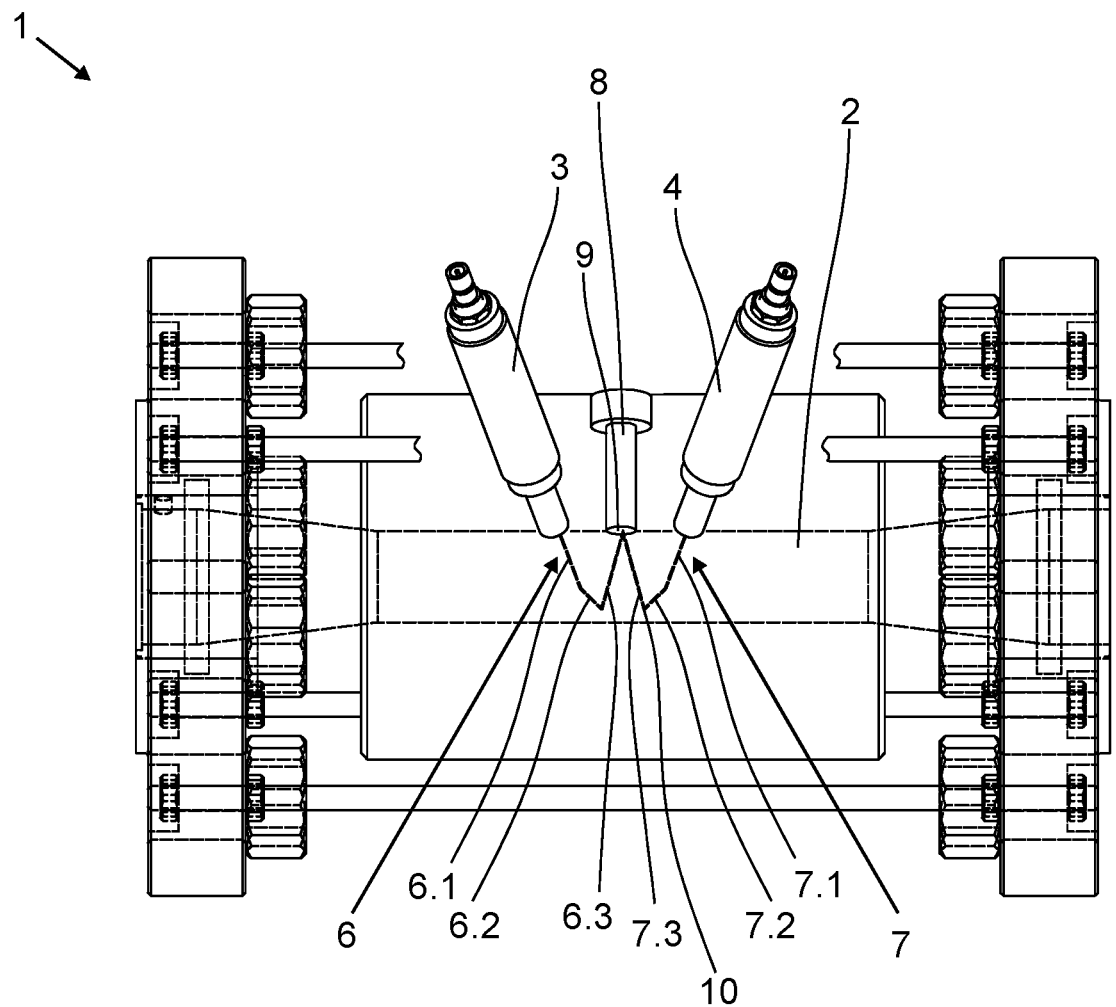
FIG. 1 illustrates a first embodiment of an ultrasonic flowmeter according to the invention.

FIG. 1 shows an embodiment of an ultrasonic flowmeter 1 with a measuring tube 2 and with a first ultrasonic transducer 3, which is designed as an ultrasonic transmitter or as an ultrasonic receiver depending on the operating mode, and with a second ultrasonic transducer 4, which is also designed either as an ultrasonic transmitter or as an ultrasonic receiver depending on the operating mode. The ultrasonic transducers 3 and 4 are arranged offset on the measuring tube as seen in the direction of flow such that the respective transmitter emits an ultrasonic signal in the direction of flow or against the direction of flow during operation and that the receiver receives the ultrasonic signal emitted by the transmitter. The course of the ultrasonic signal between the ultrasonic transducers 3, 4 defines a signal path 5.

The signal path 5 formed between the ultrasonic transducers 3 and 4 has a first signal path section 6 and a second signal path section 7, wherein the first signal path section 6 has three sub-sections 6.1, 6.2, 6.3 and wherein the second signal path section 7 also has three sub-sections 7.1, 7.2 and 7.3. In this case, the sub-sections 6.1 and 7.3, as well as the sub-sections 6.2 and 7.2 and the sub-sections 6.3 and 7.1 each lie in the same plane parallel to the measuring tube axis. A reflector element 8 with a reflecting surface 9 is arranged between the first signal path section 6 and the second signal path section 7. Each signal path section 6, 7 has two further reflections, whereby the respective reflecting surfaces 10 are formed by the smooth inner wall 11 of the measuring tube 2.

Due to the course of the signal path 5, the medium flowing through the measuring tube is first scanned counterclockwise and then clockwise or vice versa during operation, depending on the direction of flow.

The advantage of the ultrasonic flowmeter shown here is that it has a particularly simple design and guarantees a particularly high measuring accuracy, even with flows that exhibit vortices.

Figure 2:
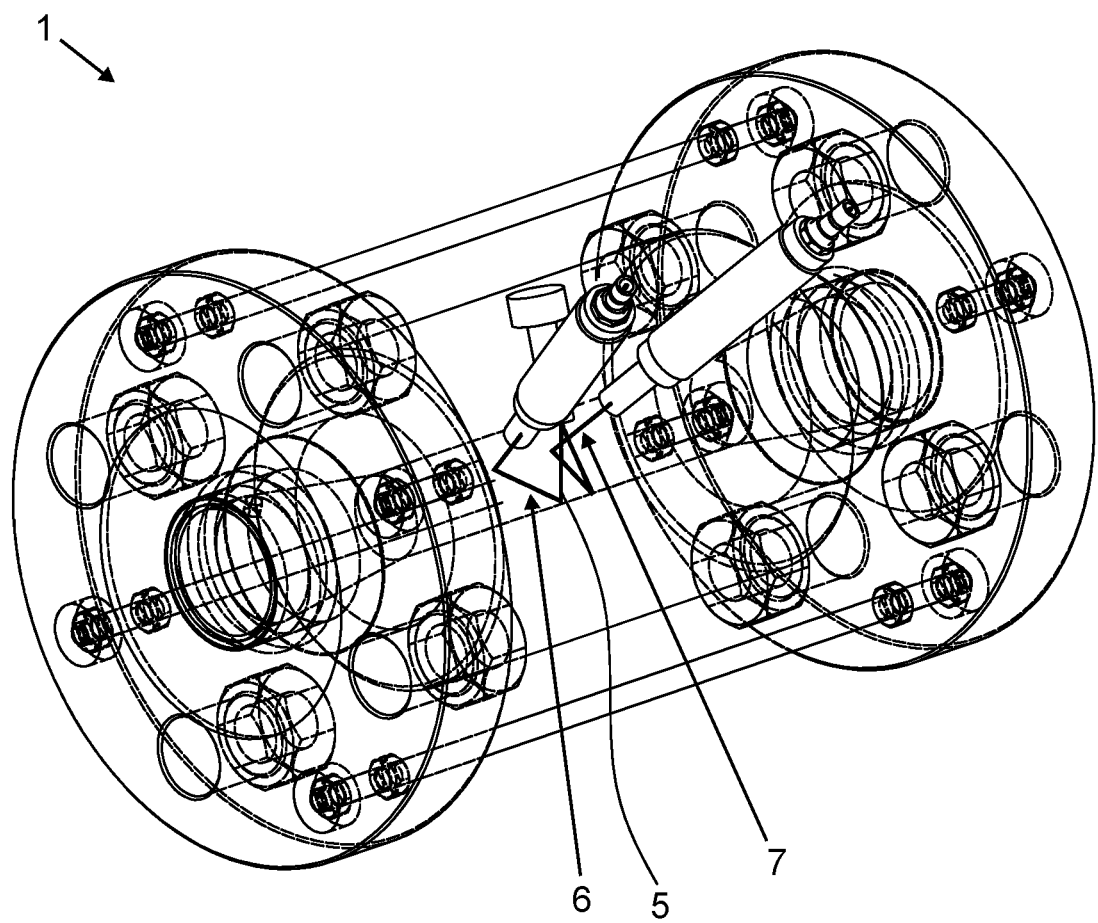
FIG. 2 illustrates the first embodiment of the ultrasonic flowmeter according to the invention in a further view.

FIG. 2 shows the same embodiment of the ultrasonic flowmeter 1 in a different view. It is shown that the signal path 5 as a whole, but also each signal path section 6 and 7 form a closed path, wherein, viewed in the axial direction, both the ultrasonic transducers 3 and 4 and the reflecting surface 9 are arranged at the same point on the circumference of the measuring tube. In the embodiment shown, each signal path section 6 and 7 is formed in the shape of a triangle in axial plan view, wherein the first signal path section 6 passes through the measuring tube in counterclockwise direction in axial plan view and wherein the second signal path section 7 passes through the measuring tube in clockwise direction, so that any vortices in the flow profile are filtered out particularly easily in that the ultrasonic signal passes through the vortices in the same plane both in clockwise and counterclockwise direction.

Figure 3:
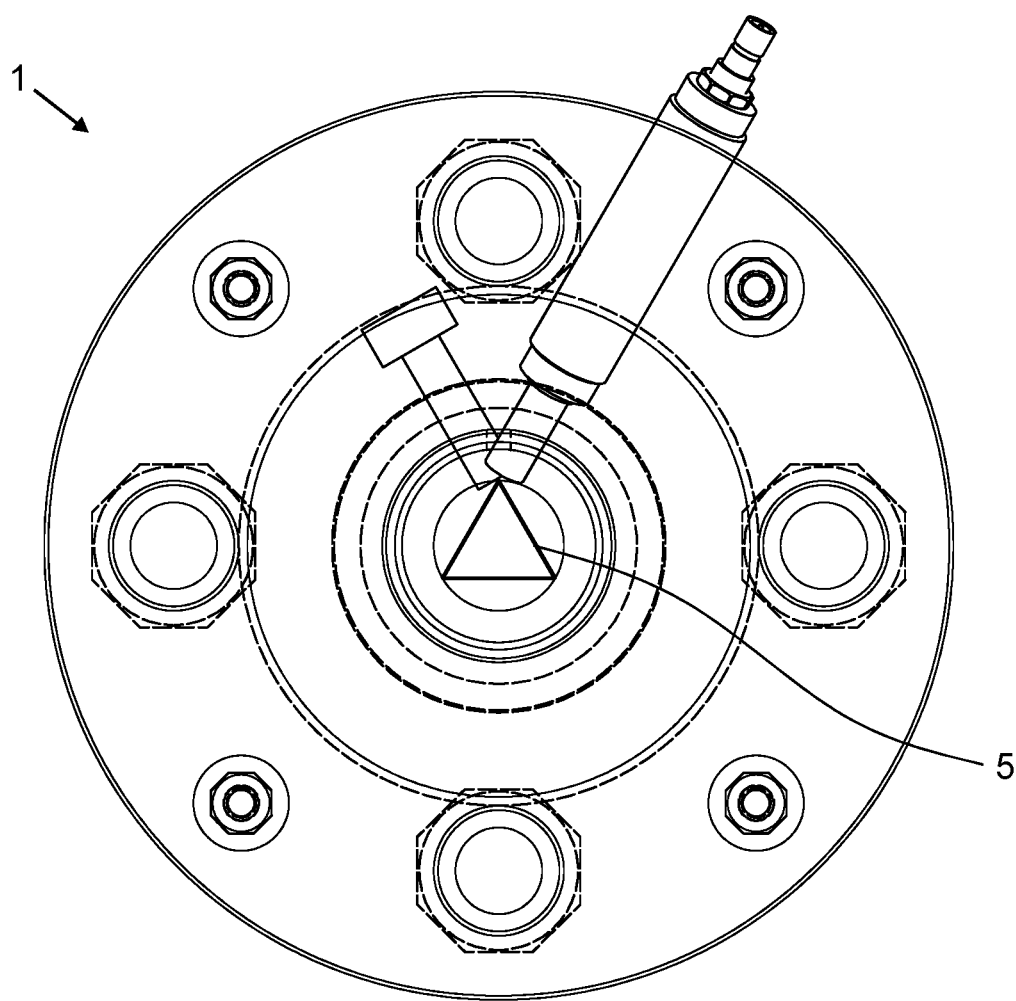
FIG. 3 illustrates the first embodiment of the ultrasonic flowmeter according to the invention in axial plan view of the measuring tube cross-section.

FIG. 3 shows the axial top view of the measuring tube cross-section of the first embodiment of the ultrasonic flowmeter 1. The illustration shows that in this view, the signal path 5 or the signal path sections 6 and 7 have the shape of a triangle.

Figures 4A, 4B, 4C, 4D:
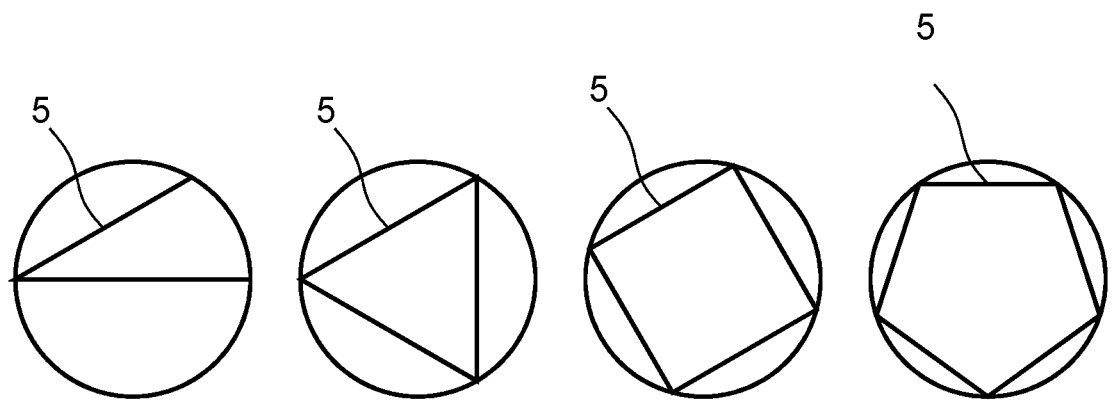
FIGS. 4a-4d illustrate different geometries of the signal path between the ultrasonic transducers in axial top view.

In FIGS. 4a to 4d, alternative signal path courses of signal path 5 are shown schematically in axial plan view. In the simplest case, each signal path section 6, 7 comprises only one reflection, for example against the inner wall of the measuring tube 2, wherein the signal path 5 additionally comprises a reflection between the first signal path section 6 and the second signal path section 7, which reverses the direction of rotation of the signal path 5 or the ultrasonic signal emitted during operation. This particularly simple design is shown in FIG. 4a.

In addition, the signal path 5 can also have the shape of a triangle (FIG. 4b) or a quadratic shape (FIG. 4c) in axial plan view, wherein the more outer areas of the flow profile can be detected, or it can also have the shape of a pentagon (FIG. 4d), wherein the edge area of the flow profile can also be detected.

Figure 5:
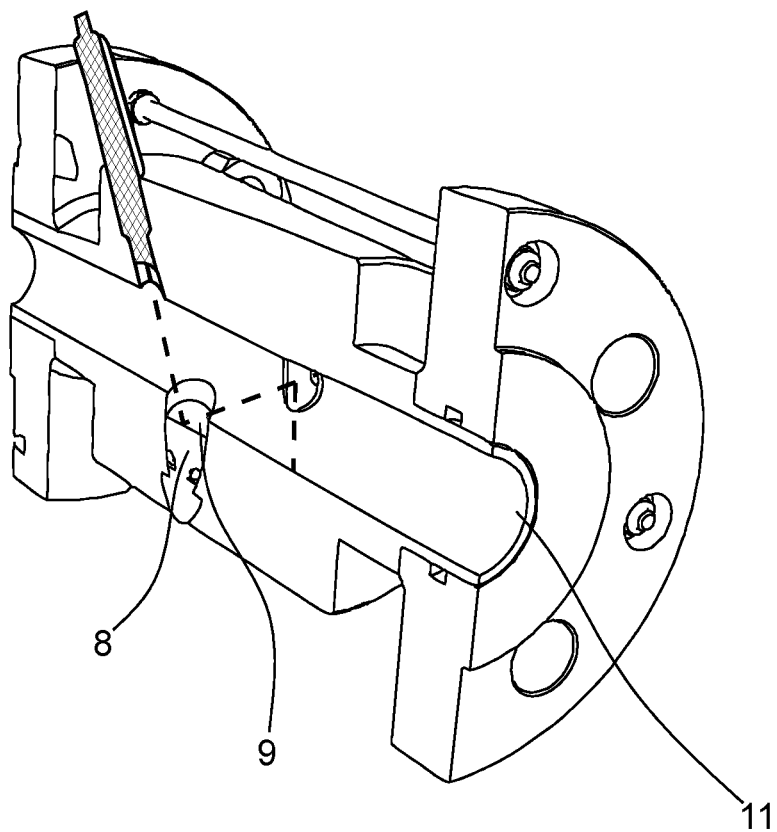
FIG. 5 illustrates a further embodiment of an ultrasonic flowmeter in partial view.

One or more reflector elements 8 can be provided for flexible configuration of the signal course, wherein the reflector element 8 or the reflecting surface 9 can either be set back in relation to the inner wall 11 of the measuring tube 2 or also project into the measuring tube 2. This is shown in FIG. 5. Depending on the arrangement of the reflecting surfaces 9, it is thus possible to measure areas of the flow profile which are more in the edge area or also areas which are close to the measuring tube axis. In addition, the ultrasonic transducers 3, 4 can also be set back or project into the measuring tube 2 in order to implement different geometries of the signal course.

As a result, all embodiments show an ultrasonic flowmeter or parts of it, wherein a particularly high measuring accuracy can be guaranteed due to advantageous signal routing.

The invention claimed is:

1. An ultrasonic flowmeter, comprising:
a measuring tube;
a first ultrasonic transducer designed as an ultrasonic transmitter and/or as an ultrasonic receiver; and
a second ultrasonic transducer designed as an ultrasonic transmitter and/or as an ultrasonic receiver;
wherein the first and second ultrasonic transducers are arranged offset on the measuring tube, viewed in the direction of flow, such that, during operation, one or more of the first or second transmitters transmits an ultrasonic signal in the direction of flow or against the direction of flow, and such that a respective receiver receives the ultrasonic signal transmitted by the first or second transmitter after at least three reflections;
wherein at least three reflecting surfaces are provided;
wherein a course of the ultrasonic signal from the first ultrasonic transducer to the second ultrasonic transducer defines a signal path;
wherein the signal path has a first signal path section and a second signal path section;
wherein the first signal path section has at least two sub-sections, the second signal path section has at least two sub-sections, and the number of sub-sections of the first signal path section corresponds to the number of sub-sections of the second signal path section; and
wherein, in an axial plan view from the first ultrasonic transducer to the second ultrasonic transducer, the signal path in the first signal path section has a first direction of rotation, the signal path in the second signal path section has a second direction of rotation, and the second direction of rotation is opposite the first direction of rotation;
wherein the first ultrasonic transducer and the second ultrasonic transducer and a reflecting surface between the first signal path section and the second signal path section are arranged in the axial direction of the measuring tube at the same point on the circumference of the measuring tube or slightly offset with respect to the measuring tube circumference.

2. The ultrasonic flowmeter according to claim 1, wherein the measuring tube has an inner wall; and
wherein a reflecting surface is formed by the inner wall of the measuring tube.

3. The ultrasonic flowmeter according to claim 1, further comprising a reflector element arranged between the first signal path section and the second signal path section.

4. The ultrasonic flowmeter according to claim 3, wherein the reflector element or a reflecting surface formed by the reflector element is set back in relation to the inner wall of the measuring tube.

5. The ultrasonic flowmeter according to claim 1, wherein the reflecting surface between the first signal path section and the second signal path section is formed such that the reflection causes a reversal of direction with respect to the rotation of the signal path.

6. The ultrasonic flowmeter according to claim 1, wherein the first signal path section includes more than two sub-sections;
  wherein the first signal path section in axial plan view of the measuring tube cross-section passes through a flow cross-section in a substantially circular manner;
  wherein the second signal path section includes more than two sub-sections; and
  wherein the second signal path section in axial plan view of the measuring tube cross-section passes through the flow cross-section in a substantially circular manner.

7. The ultrasonic flowmeter according to claim 1, wherein the signal path is designed as a closed path in axial plan view of the measuring tube cross-section.

8. The ultrasonic flowmeter according to claim 1, wherein each signal path section forms a closed path in axial plan view of the measuring tube cross-section.

9. The ultrasonic flowmeter according to claim 8, wherein the signal path of the first signal path section and the signal path of the second signal path section are essentially congruent in axial plan view.

10. The ultrasonic flowmeter according to claim 1, wherein the first signal path section and the second signal path section each have more than two sub-sections; and
  wherein the signal path and/or each signal path section forms a polygon in axial plan view of the measuring tube cross-section.

* * * * *